United States Patent [19]
Carbonell

[11] Patent Number: 5,752,469
[45] Date of Patent: May 19, 1998

[54] HABITAT FOR RODENTS AND METHOD OF MAKING SAME

[76] Inventor: Roger L. Carbonell, 1422 Pioneer Ct., Waukegan, Ill. 60085

[21] Appl. No.: 660,515

[22] Filed: Jun. 7, 1996

[51] Int. Cl.$^6$ ...................................................... A01K 1/00
[52] U.S. Cl. ............................................ 119/482; 119/483
[58] Field of Search ........................................ 119/482, 483, 119/28.5, 702, 430, 433, 428

[56] References Cited

U.S. PATENT DOCUMENTS

| | | | |
|---|---|---|---|
| D. 224,685 | 8/1972 | Michlap | D30/2 |
| D. 224,792 | 9/1972 | Knox | D30/4 |
| D. 268,444 | 3/1983 | Young | D30/4 |
| D. 298,577 | 11/1988 | Faxon | D30/108 |
| D. 334,445 | 3/1993 | Kiani | D30/108 |
| D. 342,115 | 12/1993 | Petersheim et al. | D21/242 |
| 1,230,780 | 6/1917 | Reiber | 119/1 |
| 1,495,900 | 5/1924 | Foster | 119/433 |
| 3,552,356 | 1/1971 | Rosenthal | 119/1 |
| 5,289,795 | 3/1994 | Mohilef | 119/51.1 |
| 5,423,290 | 6/1995 | Payne | 119/702 |

OTHER PUBLICATIONS

"Novel Back Yard Bird Houses", Handy Man's Home Manual, 1935 edition, p. 63.
"Csatles In The Air for Friendly Birds", How to Build It, Morden Mechanic Publishing Co., p. 125, 1936.

*Primary Examiner*—Edgar S. Burr
*Assistant Examiner*—Anthony H. Nguyen
*Attorney, Agent, or Firm*—Meroni & Meroni

[57] ABSTRACT

A habitat for rodents and a method for making same is provided. The habitat comprises a housing formed of coconut shell. The coconut shell defines a inner cavity therein. The coconut shell is comprised of a material resistant to gnawing damage by the rodents and has thermal retention characteristics to allow the rodent to burrow within the cavity in approximately adjacency with an inner curved surface of the coconut shell with body heat of the rodent being radiated and relatively retained by the coconut shell to heat a portion of the coconut shell to assist in maintaining the relative warmth of the rodent. The housing has an opening defining an entrance to the cavity with the opening being sized and adapted to accommodate the rodent therethrough.

12 Claims, 7 Drawing Sheets

Figure 2

HABITAT FOR RODENTS AND METHOD OF MAKING SAME

BACKGROUND OF THE INVENTION

1. Field of the Invention

The present invention relates generally to habitats for small mammals, such as rodents. More particularly, the invention pertains to a habitat that is resistant to damage by the rodents.

2. Description of the Prior Art

Rodents are typically characterized by large incisors adapted for gnawing or nibbling and include mice, gerbils, hamsters, and other similar animals. When maintained in captivity as pets or for experimental purposes, habitats are commonly placed in the animals cage to provide a place for the animal to burrow or seek refuge.

Various types of habitats for small mammals, such as rodents, are known in the art. For example, cylindrical rolls formed of cardboard of the type used with various rolled paper products can provide a habitat. However, rodents by nature are inclined to readily use their incisors to chew and nibble on anything within their environment. Hence, a cylindrical roll formed of cardboard may last only a day before being shredded. Similarly, habitats formed of wood or plastic pose a similar problem. While lasting longer than one formed of cardboard or paper, the continued and persistent chewing will eventually damage or destroy the habitat.

Providing a habitat formed of metal or plaster, adds longevity to the habitat as the animals teeth are unable to chew this type of material. However, it can be argued that these types of materials are less desired by the animals as the animal can instinctly identify that such a habitat differs from one found in nature. To this degree, one component of this lessened desirability lies with the reduced heat or thermal retention characteristics of these and similar materials.

When an animal burrows within a cavity in a natural environment, the animals body heat can warm the surrounding area with a portion of the habitat retaining the heat and acting as an insulator from the outside. Wood is a material that exhibits this property. However, wood is also especially susceptible to the damage problem previously discussed. Others known materials for providing a habitat also suffer from one or more disadvantages. For example, metal conducts and diminishes heat from a habitat making it a poor material for construction. Plaster, plastic, bone, seashell and other similar types of material suffer in that they do not sufficiently retain the body heat of the animal as believed in the present invention.

What is needed is a habitat that is both resistant to animal chewing and exhibit heat retention characteristics. As will be described in greater detail hereinafter, the method and apparatus of the present invention achieves these goals and differs from those previously proposed and employs a number of novel features that render it highly advantageous over the prior art.

SUMMARY OF THE INVENTION

Accordingly, it is an object of this invention to provide a habitat for rodents that is resistant to damage by gnawing and chewing of the animals.

Another object of this invention is to provide a habitat that is capable of retaining the animals body heat so that warm weather rodents, such as gerbils, are able to seek refuge in the habitat to maintain their warmth during cold temperature seasons.

Still another object of this invention is to provide a habitat that is inexpensive to manufacture and utilizes natural materials.

To achieve the foregoing and other objectives, and in accordance with the purposes of the present invention a habitat for rodents is provided. The habitat comprises a housing formed of coconut shell. The coconut shell defines a inner cavity therein. The coconut shell is comprised of a material resistant to gnawing damage by the rodents and has thermal retention characteristics to allow the rodent to burrow within the cavity in approximately adjacency with an inner curved surface of the coconut shell with body heat of the rodent being radiated and relatively retained by the coconut shell to heat a portion of the coconut shell to assist in maintaining the relative warmth of the rodent. The housing has an opening defining an entrance to the cavity with the opening being sized and adapted to accommodate the rodent therethrough.

In accordance with a method of making the invention, method includes the steps of: providing a coconut ripened to a mature state; creating an opening in the coconut through the coconut shell of the coconut and draining the coconut water from the coconut; separating coconut meat of the coconut from the coconut shell by drying the coconut meat so that moisture is evaporated from the coconut meat and into the atmosphere through the opening causing the coconut meat to shrink and separate from the coconut shell; and removing the coconut meat by breaking the coconut meat into pieces sized for extraction through the opening, leaving the coconut shell defining an interior chamber for the rodent to burrow within, with the coconut shell having thermal retention characteristics and being formed of a material resistant to gnawing damage by the rodents.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
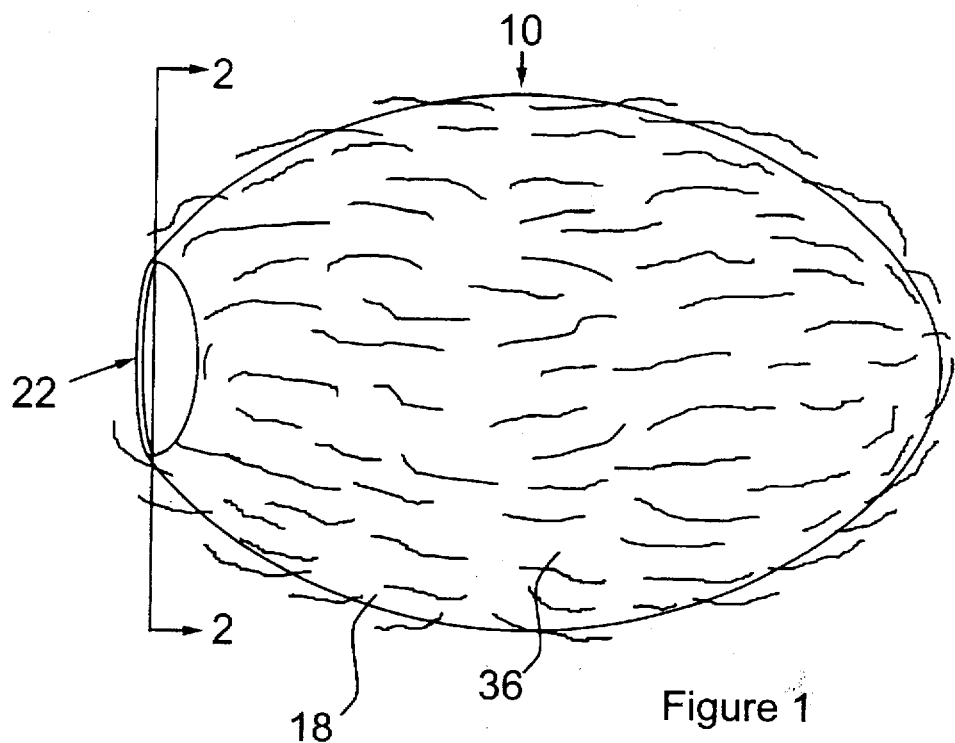
FIG. 1 is a perspective view of the present invention.
Figure 2:
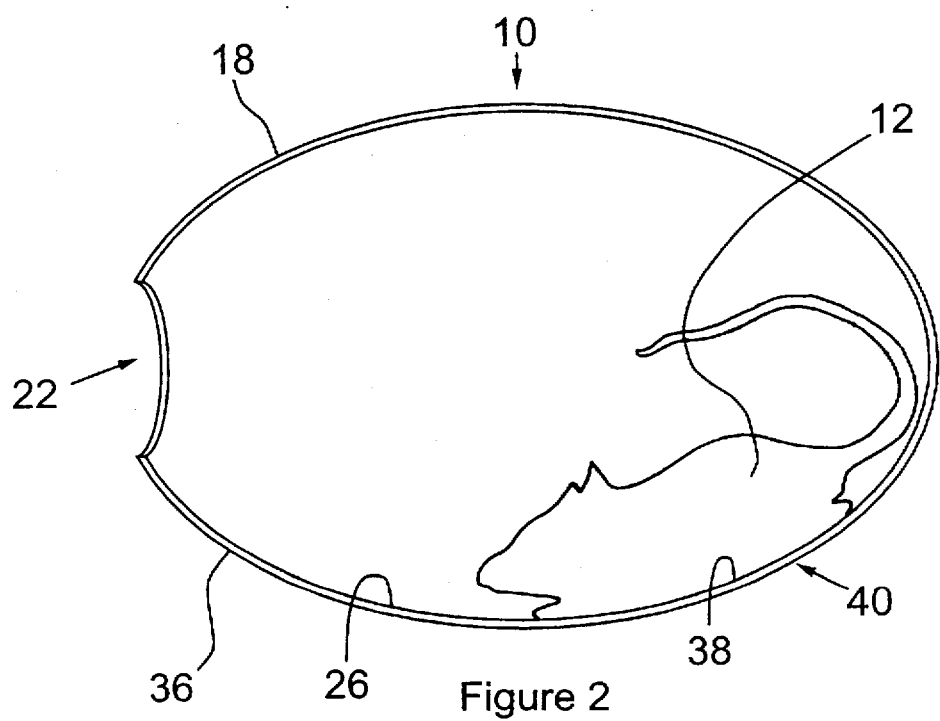
FIG. 2 is a sectional view of the present invention taken along line 2—2 of FIG. 1.
Figure 3:
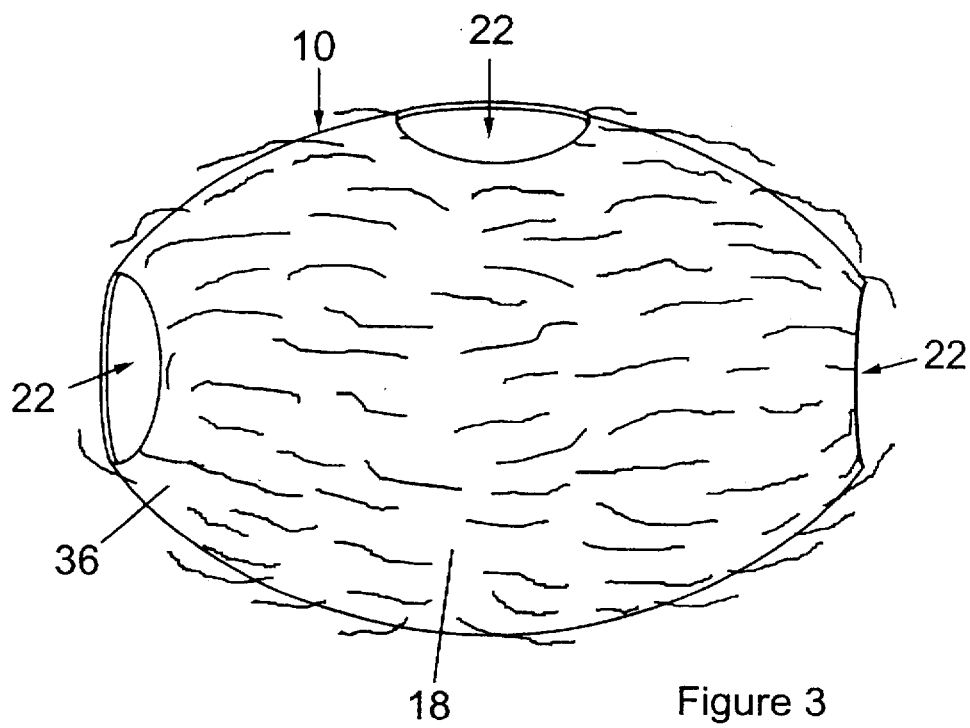
FIG. 3 is a perspective view of an alternative embodiment of the present invention.

Referring now to the drawings, a rodent habitat 10 is illustrated in FIGS. 1–3 having thermal retention characteristics to retain body heat radiated by a rodent 12 to assist in maintaining the relative warmth of the rodent. Warm weather rodents, such as gerbils, are able to seek refuge or burrow in the habitat 10 to maintain their warmth during cold temperature seasons.

Rodents 12 are typically characterized by large incisors adapted for gnawing or nibbling and include mice, gerbils, hamsters, and other similar animals. However, it should be understood that the habitat could be used with other small animals.

An important advantage over the prior art is based on the discovery that use of coconut shell to provide a habitat 10 provides both the above mentioned thermal retention characteristics as well as being resistant to gnawing damage by the rodents.

Figure 4:
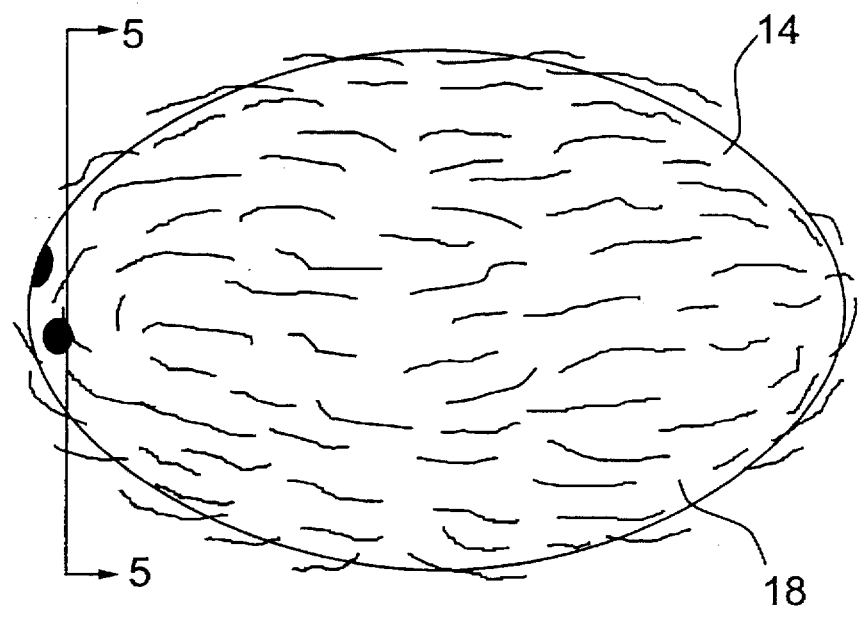
FIG. 4 is a perspective view of a ripened coconut for use with the present invention.
Figure 5:
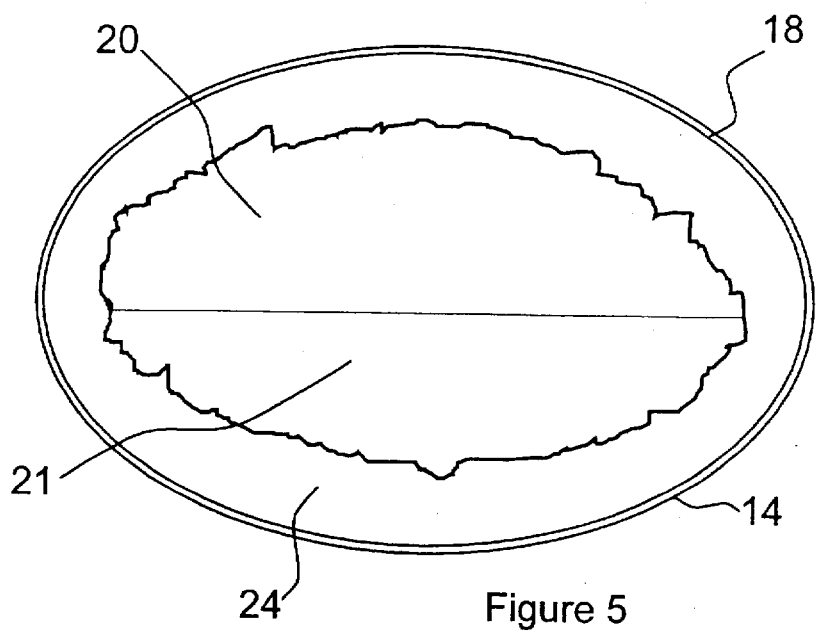
FIG. 5 is a sectional view of FIG. 4 taken along line 5—5.
Figure 6:
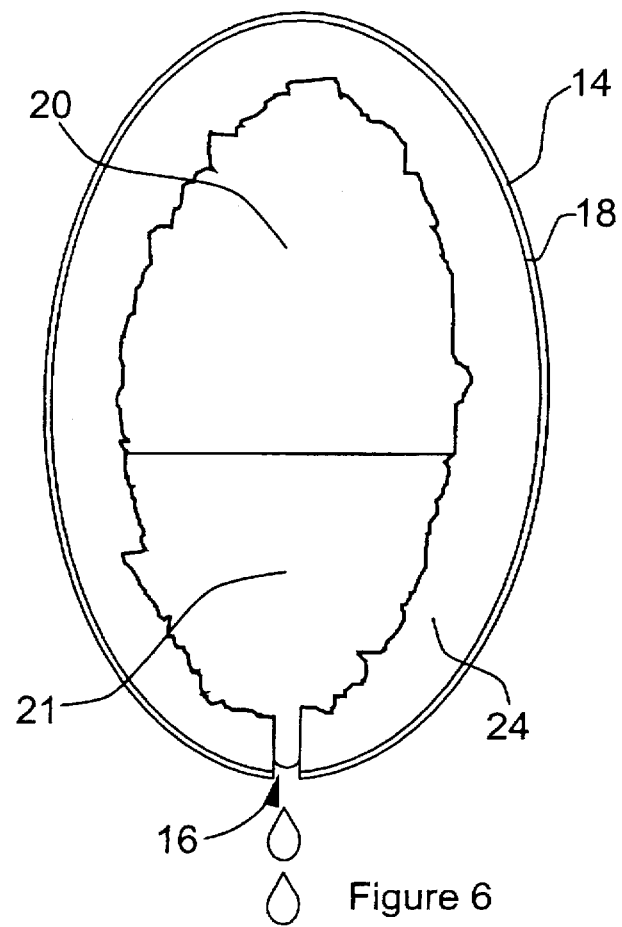
FIG. 6 is a sectional view of the coconut being drained of coconut water.

In accordance with methods for making the present invention, a coconut 14 ripened to a mature state is provided having the outer husk removed, as illustrated in FIGS. 4 and 5. Preferably, a drain hole 16 approximately 1/16 to 1/8 inches is drilled in the coconut 14 through the shell 18 of the coconut 14 and in communication with an interior chamber 20 of the coconut 14, as shown in FIG. 6. Coconut water 21 contained within the chamber 20 is then drained from the coconut 14 through the drain hole 16.

Figure 7:
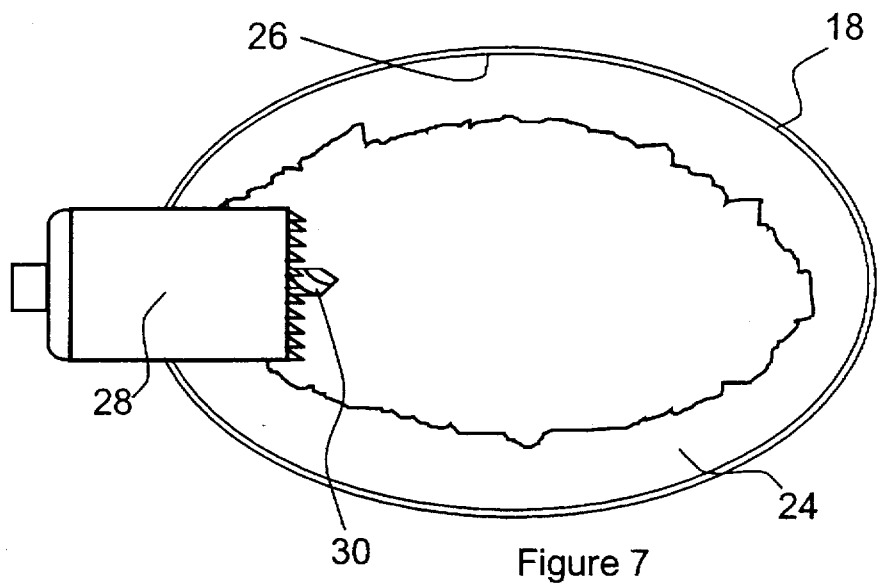
FIG. 7 is a sectional view of the coconut having an opening created.
Figure 8:
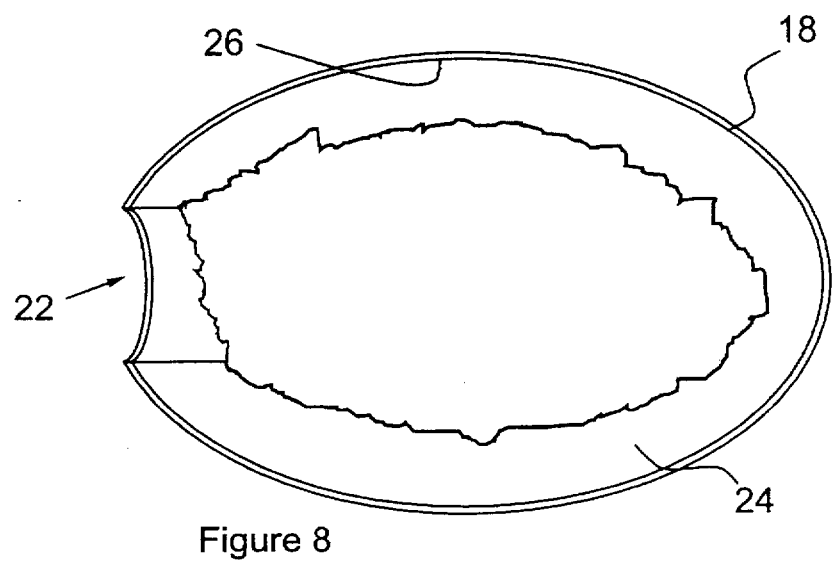
FIG. 8 is a sectional view of the coconut prior to removal of the coconut meat.

Referring now to FIGS. 7 and 8, an opening 22 is created in the coconut 14 through the coconut shell 18 and the coconut meat 24 which underlies and surrounds the coconut shell 18 about an interior surface 26 of the coconut shell 18. The opening 22 is sized and adapted to accommodate the rodent therethrough. Preferably, the opening 22 is a circular hole having a diameter in the range of approximately 1/2 to 2 1/2 inches and can be formed with the use of a hole saw 28. A pilot drill 30 of the hole saw can be inserted into the drain hole 16 so that the drain hole acts as a pilot with the opening 22 then being formed over the drain hole 16. It should be understood that the hole saw 28 could also be utilized without using the drain hole 16 as well. In a preferred embodiment shown in FIG. 1, the opening 22 is formed in approximate alignment with a longitudinal axis 23 of the coconut 14.

While the coconut 14 is generally spherically shaped or egg shaped, the coconut 14 has a longitudinal axis 23 having a length longer that the axis 25 perpendicular. Therefore, any rotational forces applied to the habitat 10 causing the habitat to rotate on a surface approximately about the longitudinal axis 23 will prevent the opening 22 from being covered.

Figure 9:
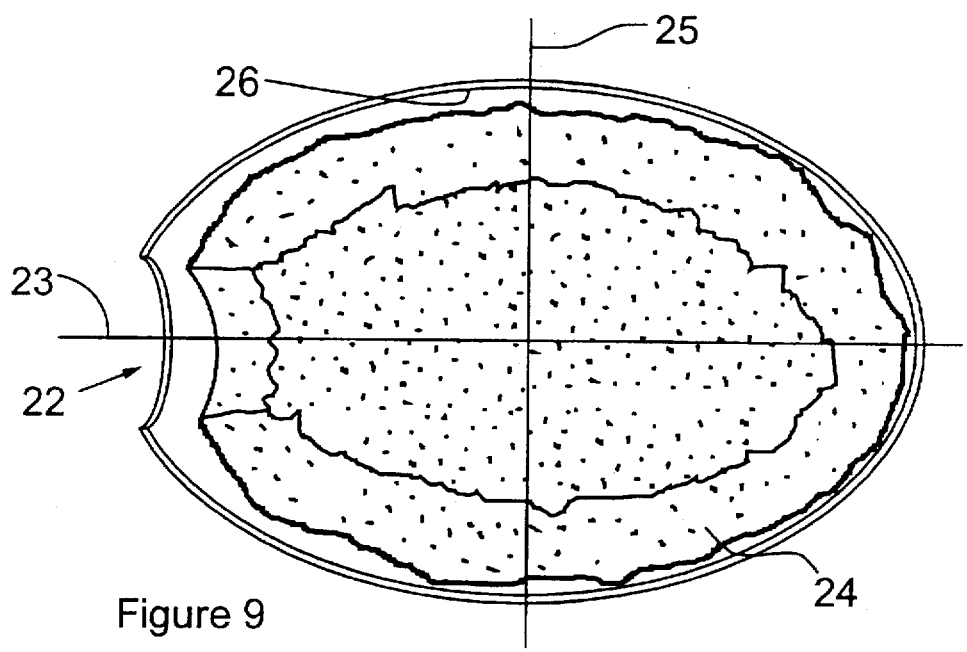
FIG. 9 is a sectional view of the coconut having the coconut meat separated.

To separate the coconut meat 24 from the coconut shell 18 (FIG. 8), the coconut meat is dried so that moisture is evaporated from the coconut meat and into the atmosphere through the opening causing the coconut meat to shrink and separate from the coconut shell, as shown in FIG. 9. Preferably, the step of separating includes cooking the coconut 14 for approximately 8 to 14 hours at a constant temperature in the range of 100 to 120 degrees Fahrenheit.

Figure 10:
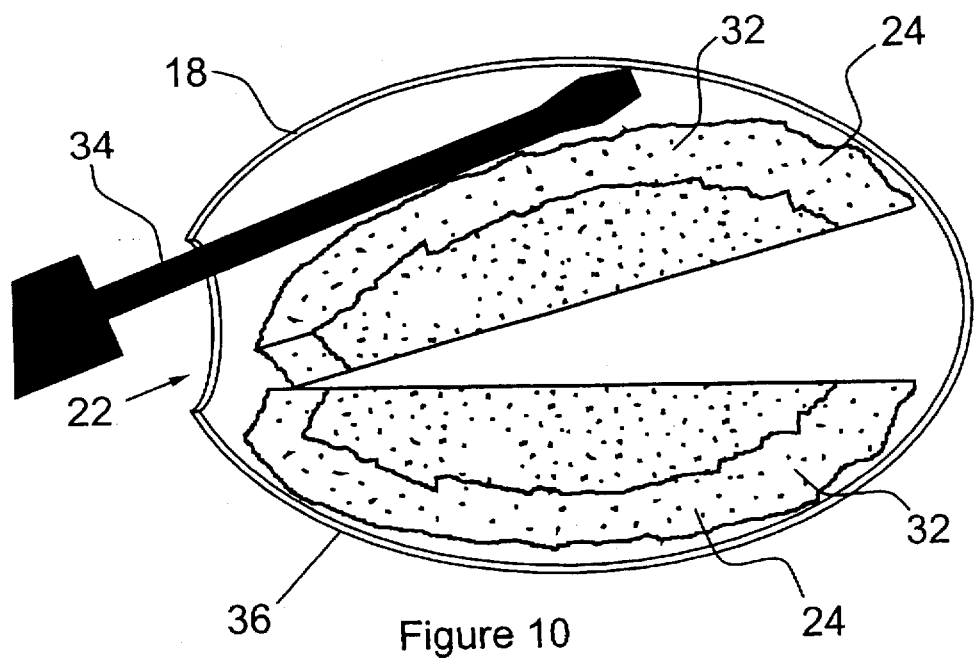
FIG. 10 is a sectional view of the coconut having the coconut meat divided.
Figure 11:
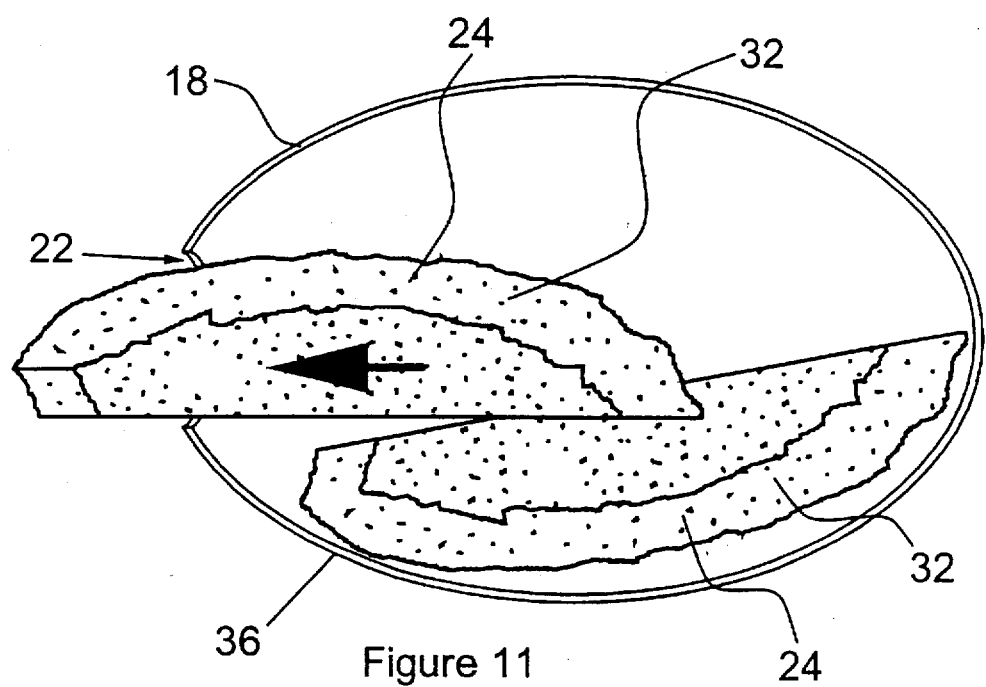
FIG. 11 is a sectional view of the coconut having the coconut meat extracted.

Referring to FIGS. 10 and 11, removal of the coconut meat 24 is best achieved by breaking the coconut meat 24 into sections or pieces 32 with a knife and/or elongated member such as a screw driver 34 so that the pieces 32 are sized for extraction through the opening 22. For example, a knife could be used to cut the coconut meat 24 into pieces, with the screw driver 34 being used to pry the coconut meat 24 from the shell 18 at points where it still may be attached.

The generally spherically shaped housing 36 formed of coconut shell of present invention consists of approximately: 8.0 percent moisture, 0.6 percent ash, 4.2 percent solvent extractives, 29.4 percent lignin, 26.6 percent cellulose, 27.7 percent pentosans, and 3.5 percent uronic anhydrides. With respect to the ash, the principal constituent is potash (30–52 percent $K_2O$) with minor quantities of lime and magnesia.

In use, the thermal retention characteristics of the housing 36 allow the rodent 12 to burrow within the cavity in approximately adjacency with an inner curved surface 38 of the coconut shell 18 with body heat of the rodent being radiated and relatively retained by the coconut shell 18 to heat a portion 40 of the coconut shell 18 to assist in maintaining the relative warmth of the rodent.

Figure 12:
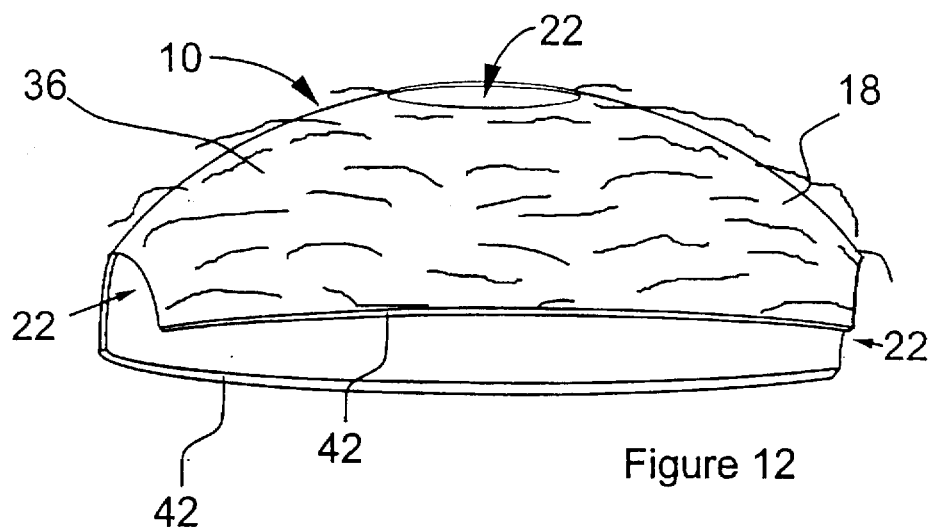
FIG. 12 is a perspective view of an alternative embodiment of the present invention.
Figure 13:
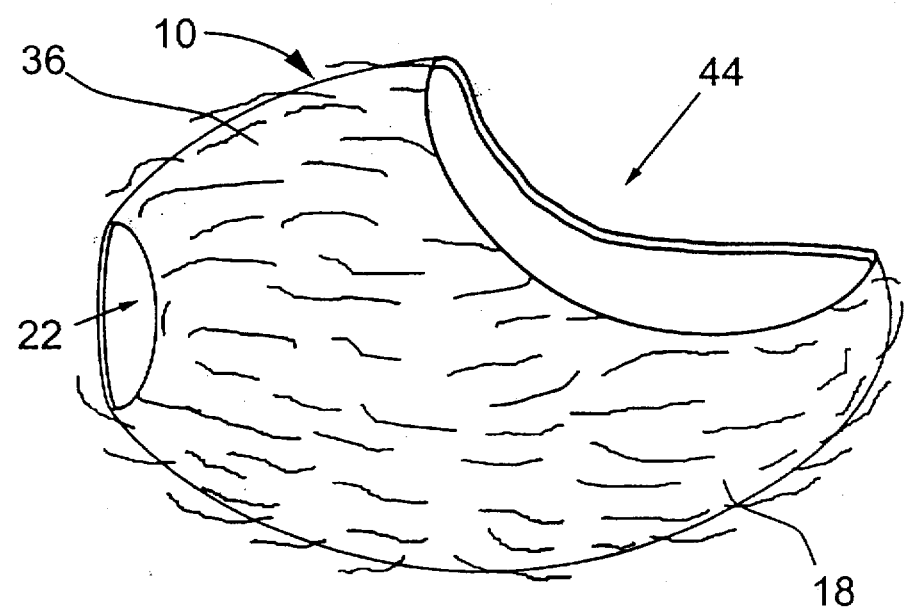
FIG. 13 is a perspective view of another alternative embodiment of the present invention.

Referring to FIGS. 12 and 13, alternative embodiments of the present invention are shown. The housing 36 of FIG. 12 may be cut in half to provide edges 42 lying in a common plane for secured engagement with a ground surface. An additional opening 44 of FIG. 13 provides an enlarged ingress and egress for the rodent 12.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A method of making a rodent habitat having thermal retention characteristics to retain body heat radiated from the rodent to assist in maintaining the relative warmth of the rodent, the habitat being resistant to gnawing damage by the rodents, the method comprising the steps of:

(a) providing a coconut ripened to a mature state;

(b) creating a drain hole having a diameter in the range of approximately 1/2 to 2 1/2 inches in the coconut through the shell of the coconut and in communication with an interior chamber of the coconut;

(c) draining the coconut water from the coconut through the drain hole;

(d) creating an opening in the coconut through the coconut shell of the coconut, the opening being sized and adapted to accommodate the rodent therethrough, the opening being positioned in approximate alignment with a longitudinal axis of the coconut, outer circumferential sidewalls of the coconut extending about the longitudinal axis being rotatably engageable with a surface while maintaining the opening in a spaced apart relationship from the surface to prevent entrapment of the rodent within the interior chamber;

(e) separating coconut meat of the coconut from the coconut shell by drying the coconut meat so that moisture is evaporated from the coconut meat and into the atmosphere through the opening causing the coconut meat to shrink and separate from the coconut shell; and (f) removing the coconut meat by breaking the coconut meat into pieces sized for extraction through the opening, leaving the coconut shell defining an interior chamber for the rodent to burrow within, with the coconut shell having thermal retention characteristics and being formed of a material resistant to gnawing damage by the rodents.

2. The method of claim 1, wherein the step of separating coconut meat of the coconut from the coconut shell by drying the coconut meat includes cooking the coconut for approximately 8 to 14 hours at a temperature in the range of 100 to 120 degrees Fahrenheit.

3. The method of claim 1, wherein the step of creating a drain hole in the coconut includes the step of drilling a hole through the coconut shell.

4. The method of claim 3, wherein the step of creating an opening in the coconut includes the step of drilling a circular hole through the coconut shell over the drain hole.

5. The method of making a rodent habitat having thermal retention characteristics to retain body heat radiated from the rodent to assist in maintaining the relative warmth of the rodent, the habitat being resistant to gnawing damage by the rodents, the method comprising the steps of:

(a) providing a coconut ripened to a mature state;

(b) creating an opening in the coconut through the coconut shell of the coconut and draining the coconut water from the coconut, the opening being sized and adapted to accommodate the rodent therethrough, the opening being positioned in approximate alignment with a longitudinal axis of the coconut, outer circumferential sidewalls of the coconut extending about the longitudinal axis being rotatably engageable with a surface while maintaining the opening in a spaced apart relationship from the surface to prevent entrapment of the rodent within the coconut shell;

(c) separating coconut meat of the coconut from the coconut shell by drying the coconut meat so that moisture is evaporated from the coconut meat and into the atmosphere through the opening causing the coconut meat to shrink and separate from the coconut shell; and (d) removing the coconut meat by breaking the coconut meat into pieces sized for extraction through the opening, leaving the coconut shell defining an interior chamber for the rodent to burrow within, with the coconut shell having thermal retention characteristics and being formed of a material resistant to gnawing damage by the rodents.

6. The method of claim 5, wherein the step of separating coconut meat of the coconut from the coconut shell by drying the coconut meat includes cooking the coconut for approximately 8 to 14 hours at a temperature in the range of 100 to 120 degrees Fahrenheit.

7. A habitat for rodents comprising: a housing formed of coconut shell, the coconut shell defining a inner cavity therein, the coconut shell being comprised of a material resistant to gnawing damage by the rodents, the material having thermal retention characteristics to allow the rodent to burrow within the cavity in approximately adjacency with an inner curved surface of the coconut shell with body heat of the rodent being radiated and relatively retained by the coconut shell to heat a portion of the coconut shell to assist in maintaining the relative warmth of the rodent, the housing having an opening defining an entrance to the cavity, the opening being sized and adapted to accommodate the rodent therethrough, the opening being positioned in approximate alignment with a longitudinal axis of the coconut, outer circumferential sidewalls of the coconut extending about the longitudinal axis being rotatably engageable with a surface while maintaining the opening in a spaced apart relationship from the surface to prevent entrapment of the rodent within the coconut shell.

8. The habitat of claim 7, wherein the coconut shell consists of approximately: 8.0 percent moisture, 0.6 percent ash, 4.2 percent solvent extractives, 29.4 percent lignin, 26.6 percent cellulose, 27.7 percent pentosans, and 3.5 percent uronic anhydrides.

9. The habitat of claim 7, wherein the opening is circular.

10. The habitat of claim 7, wherein the coconut shell has a second opening sized and adapted to accommodate the rodent therethrough.

11. A habitat for rodents comprising: a generally spherically shaped housing formed of coconut shell, the coconut shell defining a inner cavity therein, the coconut shell being comprised of a material resistant to gnawing damage by the rodents consisting of approximately: 8.0 percent moisture, 0.6 percent ash, 4.2 percent solvent extractives, 29.4 percent lignin, 26.6 percent cellulose, 27.7 percent pentosans, and 3.5 percent uronic anhydrides, the material having thermal retention characteristics to allow the rodent to burrow within the cavity in approximately adjacency with an inner curved surface of the coconut shell with body heat of the rodent being radiated and relatively retained by the coconut shell to heat a portion of the coconut shell to assist in maintaining the relative warmth of the rodent, the housing having an opening defining an entrance to the cavity, the opening being sized and adapted to accommodate the rodent therethrough and having a diameter in the range of approximately ½ to 2½ inches, the opening being positioned in approximate alignment with a longitudinal axis of the coconut, outer circumferential sidewalls of the coconut extending about the longitudinal axis being rotatably engageable with a surface while maintaining the opening in a spaced apart relationship from the surface to prevent entrapment of the rodent within the coconut shell.

12. The habitat of claim 11, wherein the coconut shell has a second opening sized and adapted to accommodate the rodent therethrough.

* * * * *